United States Patent [19]

Henegar

[11] 4,030,859

[45] June 21, 1977

[54] FLOATING AERATOR HAVING MEANS TO VARY THE LENGTH OF THE DRAFT PIPE

[75] Inventor: Dale L. Henegar, Bismarck, N. Dak.

[73] Assignee: Lake Aid Inc., Bismarck, N. Dak.

[22] Filed: Sept. 2, 1975

[21] Appl. No.: 609,581

[52] U.S. Cl. .................................. 417/61; 261/91; 261/120; 210/242 A; 417/408; 415/7; 416/171

[51] Int. Cl.² ...................... F04B 21/00; B01F 3/04

[58] Field of Search ................ 417/334, 408, 61; 415/7, 125; 416/171; 261/91, 120; 210/242 A

[56] References Cited

UNITED STATES PATENTS

| 3,086,715 | 4/1963 | Mineau et al. | 261/91 |
| 3,204,768 | 9/1965 | Daniel | 261/91 |
| 3,539,158 | 11/1970 | Roos | 261/91 |
| 3,640,514 | 2/1972 | Albritton | 261/91 |
| 3,852,384 | 12/1974 | Bearden | 210/242 A |
| 3,908,753 | 9/1975 | Balch | 417/334 |

Primary Examiner—Carlton R. Croyle
Assistant Examiner—Thomas I. Ross
Attorney, Agent, or Firm—Robert E. Kleve

[57] ABSTRACT

The invention comprises a water circulator device for circulating the water in a lake, pond, or reservoir. The device comprises a raft having a wind driven shaft mounted thereon for vertical rotation. A mixing chamber is mounted beneath the raft with the upper edge of the chamber above the surface of the lake, pond, or reservoir. The lower end of the shaft has a propellor mounted thereon within the mixing chamber. A pair of vertical telescoping pipes are mounted beneath the chamber of reduced diameter in relation to the chamber. The upper pipe is fixed to the bottom of the chamber and the lower pipe is adjustable relative to the upper pipe so that the lower end of the pipe may be located near the bottom of the lake whereby the wind may rotate the shaft to rotate the propellor with the propellor acting to draw water from the bottom of the lake up through the telescoping pipes into the mixing chamber and up over the top edge of the chamber for circulating and aerating the water in the lake during the winter months with the water at the bottom of the lake being sufficiently warm normally to keep the lake, pond, or reservoir from freezing over in the area of the device while the device is in operation.

4 Claims, 7 Drawing Figures

FLOATING AERATOR HAVING MEANS TO VARY THE LENGTH OF THE DRAFT PIPE

This invention relates to devices for mixing water currents within a lake, pond, or reservoir or the like.

It is an object of the invention to provide a novel device for pumping or drawing the water from the bottom of the lake to the top and aerates it and then releases it back into the lake.

It is another object of the invention to provide a novel wind powered device which lifts or draws the water from the bottom of the lake up into mixing chamber and then releases it to the lake.

Further objects and advantages of the invention will become apparent as the description proceeds and when taken in conjunction with the accompanying drawings.

Briefly stated, the invention comprises a lifting device for lifting water from the bottom of the lake and distributing it along the surface of the lake, comprising a raft having a vertically adjustable telescoping pipe with the lower end of the pipe adjusted near the bottom of the lake, an enlarged mixing chamber in relation to the pipe at the top of the adjustable pipe near the surface of the lake, wind driven propellor mounted in the mixing chamber with an open top to the mixing chamber and with the propellor acting to draw water and other matter from the bottom of the lake up through the pipe into the mixing chamber and causing the water to searge out over the open top of the mixing chamber back into the water for circulating the water in the lake.

Figures 1, 2, 3:
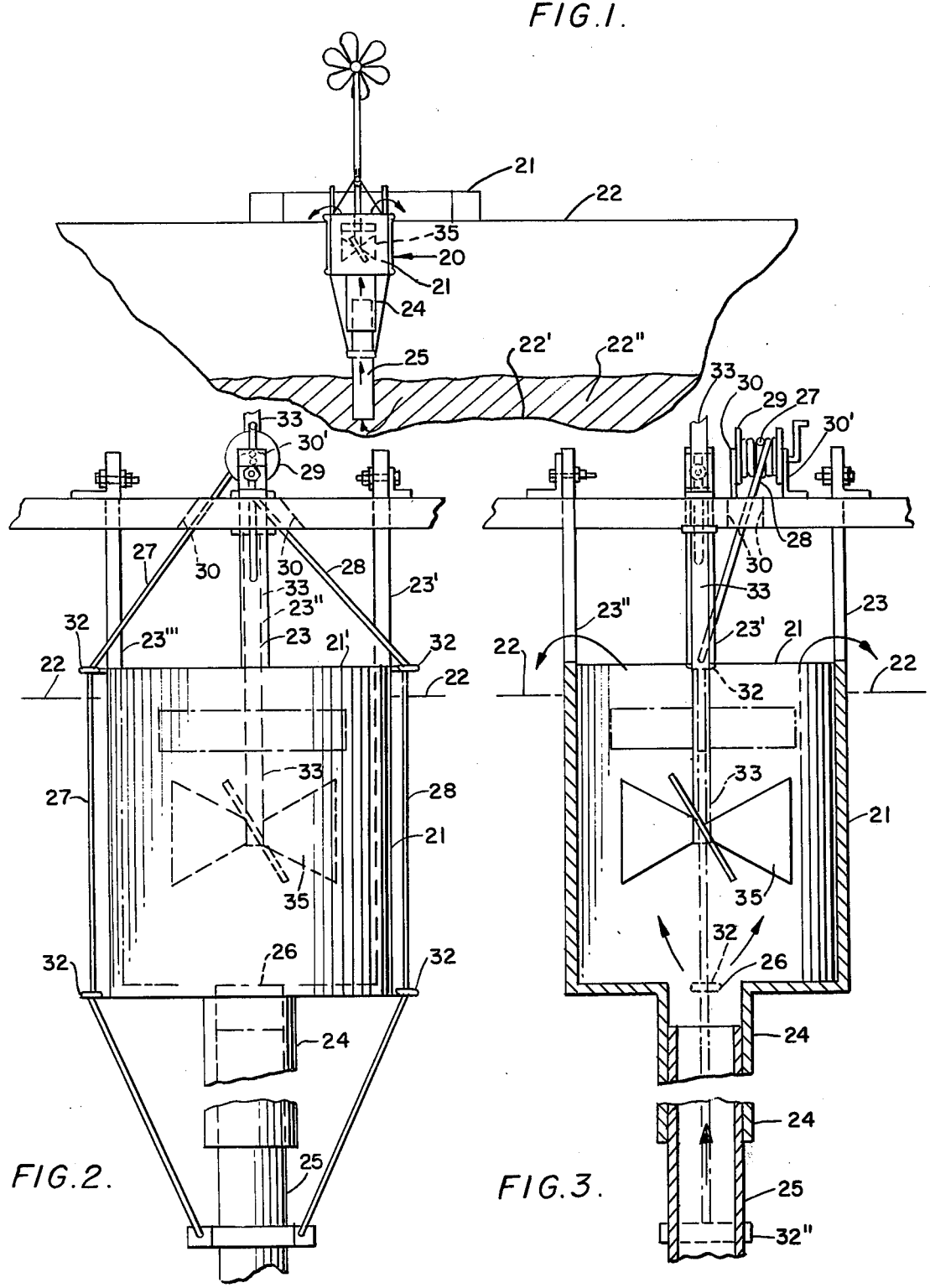
FIG. 1 is a side elevational view generally illustrating the wind drive pumping device mounted to a raft and positioned in a lake.
FIG. 2 is a fragmentary enlarged side elevational view of the wind drive pumping device.
FIG. 3 is a fragmentary front elevational view of the wind driven pumping device.

Referring more particularly to the drawings in FIG. 1, the pump and lake water circulating device 20 is illustrated as being mounted to a conventional raft 21 with the raft floating at the top surface 22 of the lake. The pumping circulating device 20 is mounted on a conventional type of rectangular raft at a location centrally of the width and length of the raft.

The pumping and water circulating device 20 has an enlarged mixing chamber 21 mounted to the undersurface of the raft by four vertical bracing rods 23, 23', 23'', and 23''' fixed at 90° to the upper edge of the cylindrical mixing chamber and extending upward through slots in the raft and held to the raft by bolts extending from L-shaped lugs fixed to the raft which bolts extend through slots in the braces and nuts threaded onto the bolts to lock the braces to the lugs with the lug fixed to the raft.

A pair of cylindrical metal pipes 24 and 25 extend downward from the bottom of the mixing chamber 21 with the pipe 24 fixed to the bottom wall of the chamber and in communication with the chamber 21 through its opening 26. The lower metal pipe 25 is slidable in the pipe 24 in telescoping relation.

A pair of wires 27 and 28 extend downward from a spool 29. Spool 29 is rotatably mounted on top of the raft 21 by brackets 30 and 30' fixed to the raft with a shaft fixed to the spool and rotatably mounted in bores in the brackets 30 and 30'.

The wires 27 and 28 extend downward from the spool through a slot 31 in the raft with wire 27 extending through a pair of eyelets 32 fixed to the upper and lower edge mixing chamber and with the lower end 27' of the wire 27 fixed to a bracket 32 which bracket 32 is fixed to the telescoping pipe 25.

The other wire 28 extends downward from the spool through the slot 31 in the raft and extends through a pair of eyelets 32' fixed to the upper and lower edge of the mixing chamber on the opposite side to eyelets 32, with the lower end 28' of the wire 28 fixed to the bracket 32'' on the telescoping pipe 25.

Rotation of the spool 29 in clockwise direction when viewed from FIGS. 1 and 2 acts to wind the cables 27 and 28 onto the spool and raise the pipe 25 upward relative to pipe 24, mixing chamber and raft, and the rotation of the spool in the opposite direction acts to wind the cables 27 and 28 and lower the pipe 25 relative to the pipe 24. A conventional spring loaded pawl may be provided with notches in the spool to lock the spool in any particular position and thereby hole the pipe 25 of a selected length relative to the upper pipe mixing chamber and a raft.

A shaft 33 is rotatably mounted in conventional bearing not shown at the top of the raft. A conventional windmill type structure 34 rotates the shaft 33. The windmill structure is of a conventional type well known in the art. It has bracing extending upward along the shaft 33 to a windmill type fan. Bracing, having its lower end fixed to the raft, extends upward and has a horizontal leg at the top with the upper end of the shaft 33 rotatably mounted in the horizontal leg. A miter gear is mounted to the top of the shaft 33 and a horizontal shaft is rotatably mounted to the horizontal leg with a mitered gear fixed to the one end of the horizontal shaft and engaging the mitered gear. A windmill type fan is fixed to the horizontal shaft so that with the pitch of the blade angled so that the wind striking the fan will rotate the fan and horizontal shaft and the mitered gear will rotate the mitered gear or shaft 33 causing shaft 33 to rotate from right to left when viewed from FIGS. 1 and 2.

A propellor or impeller 35 is fixed to the lower end of the shaft 33 and the pitch of the blades 35' and the propellor is at an angle so that rotation of the shaft 33 from left to right will rotate the propellor from left to right and act to pump water at the bottom 22' of the lake up through the telescoping pipes into the mixing chamber and cause the water to surge over the open top 21' of the mixing chamber and back into the lake.

The mixing chamber 21 is enlarged in relation to the delivery pipes 24 and 25 increasing the retention time of the water in the chamber and allows the water more time to circulate in the mixing chamber at the top of the lake before it travels over the top of the chamber. This causes better aeriation of the water by increasing the distance the water travels with the tank prior to release or travel over the top of the chamber by exposing the moving water to the air at the top circulating water in the chamber for a longer period of time. This is because the rate of oxygen absorption by the water is a function of the time the oxygen is exposed to the water.

It is desirable that the lower end of pipe 25 be adjustable close to the bottom 22' of the lake. In any lake, pond, or reservoir, the nutrients tend to be concentrated in the bottom waters 22'' (hypoliminion). These nutrients tend to bring about a condition known as eutrophication. Eutrophication will ulitimately result in a degradation of water quality and death of the aquatic community. As eutrophication progresses the bottom sediments, particularly in the deeper water (hypolimnion) will use up the oxygen normally dissolved in the water causing anaerobic conditions thereby causing bacterial decomposition (without oxygen) of the bottom materials. When this happens there are a number of toxic gases released from the bottom sediments (ammonia, methane, ethane, etc.). These are not only toxic to aquatic organisms but they contribute to the fertility of the lake water which will in turn cause an increase in the eutrophication rate. Also phosphorous will be released from the bottom sediments when oxygen is lacking; this also contributes greatly to eutrophication.

By drawing the water from the very bottom of the lake, where it is very short on oxygen and raising it to the surface, aerate it and then release it back into the lake, a more effective lake circulation system is provided. The telescoping pipe construction, by reaching close to the bottom 22' of the lake, facilitates bring the water at the bottom to the surface.

It has been found that the lake circulating device 20 will circulate any lake, pond, or reservoir, while at the same time put oxygen in the water and release the toxic gas to the atmosphere. It will restore a wate, pond, or reservoir to it's original top to bottom oxygenated condition greatly reducing the rage of eutrophication.

It has further been found that the invention can be placed in relatively small lakes during the winter months and the wind in many of the northern regions of this country is sufficient to keep the windmill blades rotating and the propellor rotating and operating to pipe the water from the bottom of the lake to the top of the lake to keep the lake water sufficiently oxygenated to prevent winter kill of the fish in the lake from the lack of oxygen.

The device may be moved at intervals to different parts of the lake to keep varying parts of the lake oxygenated.

Also, the shaft 33 will be mounted in sealed bearing construction, already well known to the art, so that the shaft will not freeze to the bearings. The movement of the propellor by the wind will normally be sufficient to keep the area about the raft from freezing over by the device pulling the normally warmer water at the bottom of the lake to the surface, so that the device can continue to operate throughout the winter months even in the cold conditions when the entire lake surface would otherwise be frozen over.

Thus, it will be seen that a novel and inexpensive lake, pond, or reservoir device has been provided which will effectively keep relatively small lakes supplied with sufficient oxygen in the water from top to bottom so that fish and other living matter in the lake can survive the winter months.

Figure 4:
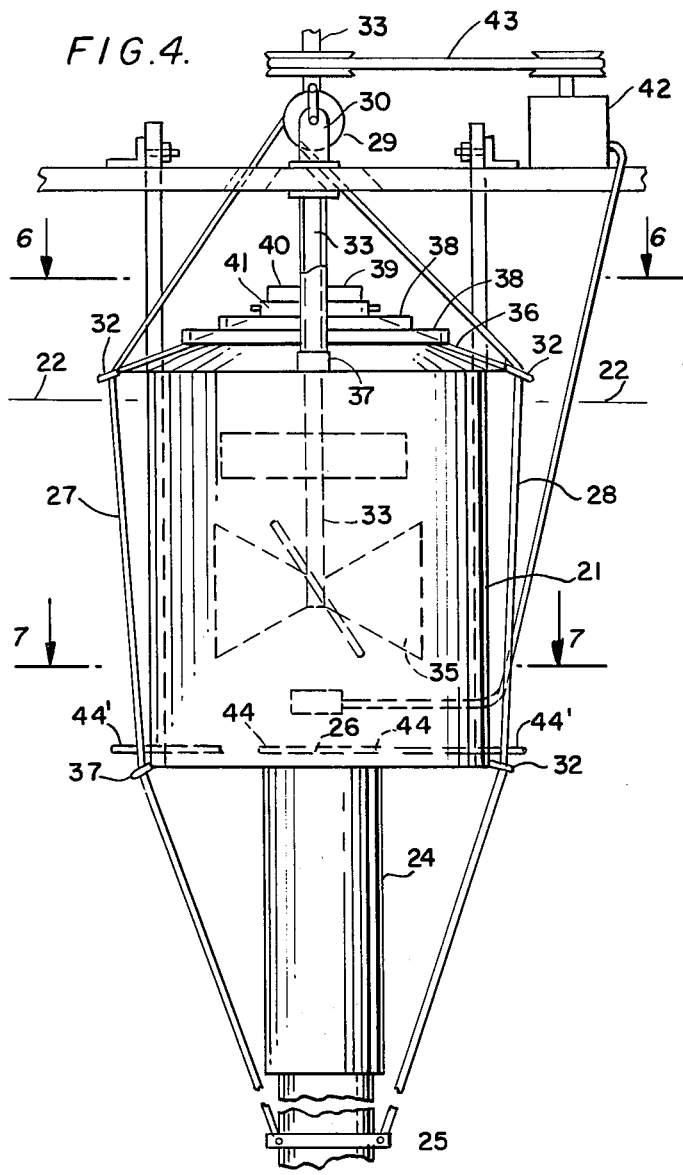
FIG. 4 is an enlarged fragmentary side elevational view of a modified form of pumping and water circulating device.
Figure 5:
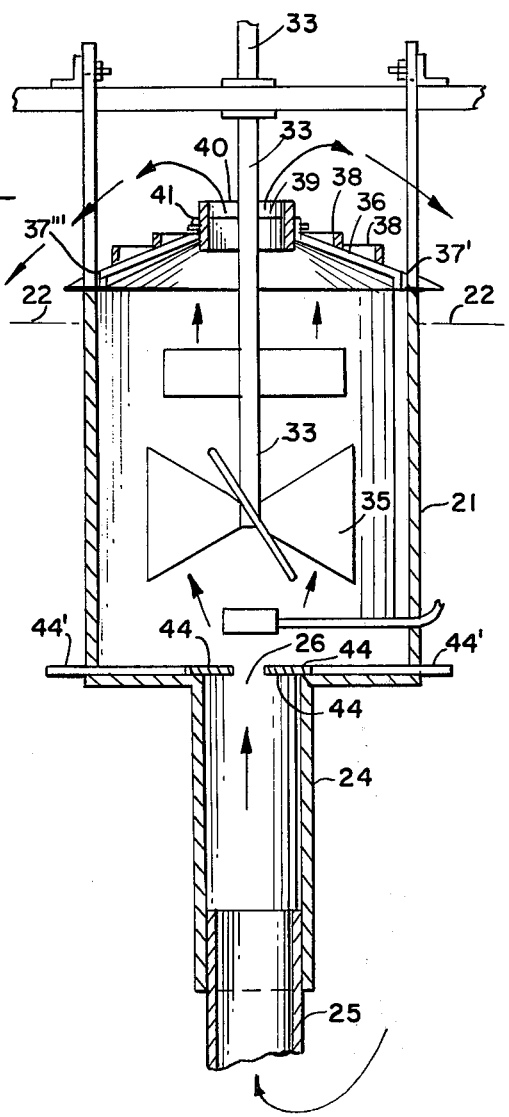
FIG. 5 is an enlarged front view of the water circulation device with portions cut away.
Figure 6:
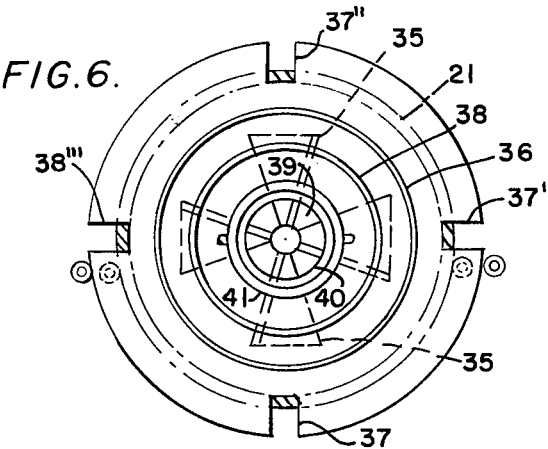
FIG. 6 is a cross-sectional view taken along the line 6—6 of FIG. 4.
Figure 7:
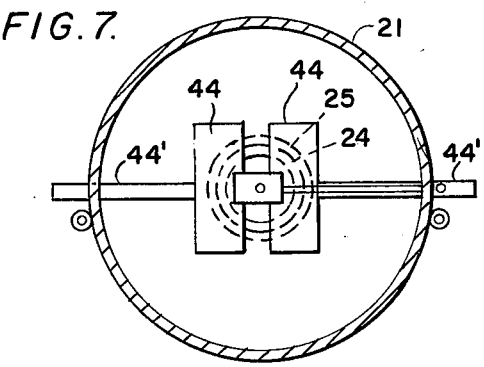
FIG. 7 is a cross-sectional view taken along line 7—7 of FIG. 4.

A modification is illustrated in FIGS. 4 and 5 having a cover 36 with slots 37, 37', 37'', and 37''' so that it may fit over the top of the mixing chamber 21 with the vertical hinges fitting in the slots.

The cover 36 has a plurality of circumferential upward projecting ribs 38 with a center opening 39. A sleeve 40 is slidably mounted in the center opening 39 and is adjusted to different heights by screws threadably mounted in a circumferential rib 41 and engaging adjust the sleeve 40 to hold it at a selected height.

The cover 36 when mounted to the device acts to further aerate the water coming up through the pipe from the bottom of the lake by causing it to rise up through the opening 39 and spill over the cover and pass over the ridges or ribs 41 before spilling off the lower edge of the cover.

By the water in the mixing chamber traveling up through the opening 39 and over the ridges, it extends the time the water is exposed to the air. Also as the water passes over the ridges it tends to be more turbulent and is exposed more efficiently to the air causing an increase in oxygenation and gas release.

Also, an air compressor 42 may be provided mounted on the raft and over by the shaft 33 by pulley and a V belt connection 43, pumping air through an air line 44 from the compressor down along the air line and out into the mixing chamber beneath the propellor to further oxygenate the water.

Also, the height of the upper edge of the mixing chamber 21 must be adjusted above the level of the top or surface of the lake so that a spill over action is created.

Also, a pair of sliding plates 44 each having handles 44'. The handles 44' project through bores in the mixing chamber and are slidably mounted in the bores to slide over the opening 26 to vary the size of the opening.

In some instances, it may be desirable to have the upper edge of the mixing chamber 21' below the surface of the lake if maximum water movement of displacement is desired to break up a thermal stratification system. However, it is desirable that the upper edge of the chamber be in close proximity with the surface.

It will be obvious that various changes and departures may be made to the invention without departing from the spirit and scope thereof and accordingly it is not intended that the invention be limited to that specifically described in the specification or as illustrated in the drawings, but only as set forth in the appended claims wherein.

What is claimed is:

1. A water circulating device for circulating and aerating the water in a lake, a pond, or reservoir comprising a floatation raft, a shaft rotatably mounted on said raft to rotate about a vertical axis, a wind drive motor for driving said shaft, a cylindrical mixing chamber mounted beneath said raft, said chamber having a cylindrical side wall and a bottom wall and having an opening formed by the side walls upper edge located above the surface of the lake, pond, or reservoir, said shaft projecting downward into said mixing chamber, a propellor mounted to the lower end of said shaft within the mixing chamber, a plurality of vertically elongated pipes, said plurality including uppermost and lowermost pipes, said pipes being mounted in telescoping relation with the uppermost pipe fixed to the bottom of the mixing chamber, said chamber having an opening in the bottom communicating with said uppermost pipe, said lowermost pipe being slidably mounted relative to said raft and said uppermost pipe, means on said raft to selectively adjust said lowermost pipe upward and downward relative to the raft and the uppermost pipe and relative to the bottom of the lake so that the lowermost edge of the lowermost pipe may be located near the bottom of the lake, said propellor having pitched blades, so that upon rotation of the propellor in the chamber by the wind driven motor rotating the shaft, the propellor in the chamber will draw water up from the bottom of the lake into the lower end of the lowermost pipe up through the plurality of pipes into the mixing chamber, with the water moving upward to the surface and over the upper edge of the side wall to aerate the water.

2. A water circulating device for circulating and aerating the water in a lake, pond, or reservoir, comprising a raft having a shaft thereon mounted for rotation on a vertical axis, a wind driven motor to rotate said shaft a mixing chamber mounted beneath the raft, said chamber having an opening at the top of the chamber above the surface of the lake, pond, or reservoir, a propellor mounted to the lower end of the shaft within the mixing chamber, a plurality of vertical elongated pipes of reduced diameter in relation to said chamber, said pipes being mounted in telescoping relation to one another, with the upper most pipe fixed to the bottom of said mixing chamber and in communication therewith, means to selectively adjust the lowermost pipe in slidable telescoping relation to the uppermost pipe whereby said lowermost pipe at its lowermost edge may be adjusted upward and downward in vertical relation to the bottom of the lake, so that the lower end of the lowermost pipe may be located near the bottom of the lake, said propellor in the chamber having pitched blades to that upon rotation of the propellor by the wind motor driven shaft, the propellor will draw water up from the bottom of the lake up through the plurality of pipes into the mixing chamber and cause the water to surge upward out of the chamber through the opening at the top of the chamber and back to the lake, with the movement of the water to the surface and over and out of the chamber exposing the water to the atmosphere to aerate the water.

3. A water circulating device according to claim 2 wherein said mixing chamber has a cover means mounted over the top of said mixing chamber said cover means having a central opening of reduced size in relation to said mixing chamber said water in said mixing chamber surging upward and out of the chamber through the said opening at the top of the chamber through said central opening in said cover at the top of the chamber and outward along the upper surfaces of the cover and back into the lake, said cover having a plurality of projecting ridges along its upper surfaces so that said water, when traveling along the upper surfaces of the cover, travels over the ridges before returning to the lake delaying the travel of the water to expose the water longer to the atmosphere to increase aeration of the water.

4. A water circulating device according to claim 2 wherein said mixing chamber has an annular flange means projecting outward and downward from the opening at the top of the chamber at an outward angle from horizontal with ridges along the upper surfaces of the annular flange means, said water in said chamber surging upward and out of the chamber through said opening at the top of the chamber traveling along the upper surfaces of said annular flange means and over said ridges before returning to the lake delaying the travel of the water to expose the water longer to the atmosphere to increase aeration of the water.

* * * * *